US008504626B2

(12) United States Patent
Nairn et al.

(10) Patent No.: US 8,504,626 B2
(45) Date of Patent: Aug. 6, 2013

(54) SYSTEM AND METHOD FOR CONTENT TAGGING AND DISTRIBUTION THROUGH EMAIL

(75) Inventors: Rowan Nairn, San Francisco, CA (US); Lester D. Nelson, Santa Clara, CA (US); Ed H. Chi, Palo Alto, CA (US); Victoria M. Bellotti, San Francisco, CA (US); Bongwon Suh, Cupterino, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 668 days.

(21) Appl. No.: 12/699,791

(22) Filed: Feb. 3, 2010

(65) Prior Publication Data

US 2011/0191428 A1 Aug. 4, 2011

(51) Int. Cl.
*G06F 15/16* (2006.01)
(52) U.S. Cl.
USPC ........... 709/206; 709/207; 709/231; 707/722; 713/170
(58) Field of Classification Search
USPC .......... 709/206, 207, 231; 707/722; 713/170
See application file for complete search history.

(56) References Cited

U.S. PATENT DOCUMENTS

| | | | |
|---|---|---|---|
| 6,636,240 B1 * | 10/2003 | Centerwall et al. | 715/752 |
| 7,010,572 B1 * | 3/2006 | Benjamin et al. | 709/206 |
| 7,092,729 B1 * | 8/2006 | Fichet et al. | 455/466 |
| 7,321,887 B2 | 1/2008 | Dorner et al. | |
| 7,395,316 B2 | 7/2008 | Ostertag et al. | |
| 7,689,563 B1 * | 3/2010 | Jacobson | 707/663 |
| 7,962,850 B2 * | 6/2011 | Haynes et al. | 715/271 |
| 2004/0111478 A1 * | 6/2004 | Gross et al. | 709/206 |
| 2004/0199604 A1 * | 10/2004 | Dobbins et al. | 709/217 |
| 2005/0132401 A1 * | 6/2005 | Boccon-Gibod et al. | 725/34 |
| 2005/0223062 A1 * | 10/2005 | Doan et al. | 709/206 |
| 2006/0271961 A1 * | 11/2006 | Jacoby et al. | 725/46 |
| 2007/0005702 A1 * | 1/2007 | Tokuda et al. | 709/206 |
| 2007/0106742 A1 * | 5/2007 | Bellegarda et al. | 709/206 |
| 2007/0143411 A1 * | 6/2007 | Costea et al. | 709/206 |
| 2008/0098125 A1 * | 4/2008 | Wang Baldonado et al. | 709/231 |
| 2009/0044013 A1 * | 2/2009 | Zhu et al. | 713/170 |
| 2009/0112995 A1 * | 4/2009 | Addae et al. | 709/206 |
| 2009/0319623 A1 * | 12/2009 | Srinivasan et al. | 709/206 |
| 2010/0064231 A1 * | 3/2010 | Gupta | 715/748 |
| 2010/0223338 A1 * | 9/2010 | Hodes | 709/206 |
| 2010/0312836 A1 * | 12/2010 | Serr et al. | 709/206 |
| 2011/0087742 A1 * | 4/2011 | Deluca et al. | 709/206 |
| 2011/0137999 A1 * | 6/2011 | Amsterdam et al. | 709/206 |
| 2011/0138000 A1 * | 6/2011 | Balasubramanian et al. | 709/206 |
| 2011/0184937 A1 * | 7/2011 | Jin et al. | 707/722 |
| 2011/0191428 A1 * | 8/2011 | Nairn et al. | 709/206 |

* cited by examiner

*Primary Examiner* — Ario Etienne
*Assistant Examiner* — Michael C Lai
(74) *Attorney, Agent, or Firm* — Patrick J. S. Inouye; Krista A. Wittman; Leonid Kisselev

(57) ABSTRACT

A system and method for content tagging and distribution through email are provided. A user-to-tag record including content tags, each associated with one or more users, is maintained. An incoming email message with a tag address is received. The tag address is processed to identify a content tag, which is applied to the user-to-tag record. Users associated with the identified content tag are determined. The incoming email message is provided to the associated users.

16 Claims, 7 Drawing Sheets

| USERS | TAGS |
|---|---|
| 1 | a,b,c |
| 2 | a,b,d |
| 3 | d,f |
| . | . |
| . | . |
| . | . |

FIG. 3A

| TAGS | EMAIL MESSAGES |
|---|---|
| a | I, IV |
| b | V |
| c | II, III |
| . | . |
| . | . |
| . | . |

FIG. 3B

| Delivery Data | Group Member Data | Email Message Content Data |
|---|---|---|
| From: Leo<br>To: Rob | {empty} | "I wanted to use Ruby on Rails. Have you used it?" |
| From: Rob<br>To: Nick<br>CC: Leo<br>ROR@serv.CO.com | {Leo, Rob, Nick} | "I've never used Rails, sorry. I have a feeling there are some Rails people at [X] though. N, have you?" |
| From: Nick<br>To: Rob<br>CC: Paul, Leo<br>ROR@serv.CO.com | {Leo, Rob, Nick, Paul} | "Nope, that wasn't me. I dabbled in Django (the python equivalent). Maybe P knows?" |
| From: Paul<br>To: Nick<br>CC: Rob, Leo<br>ROR@serv.CO.com | {Leo, Rob, Nick, Paul} | "I haven't used ROR myself, but, I am interested in learning about it. I'll forward this to our learning group mailing list." |

FIG. 5

SYSTEM AND METHOD FOR CONTENT TAGGING AND DISTRIBUTION THROUGH EMAIL

FIELD

This application relates in general to content tagging, and in particular, to a system and method for content tagging and distribution through email.

BACKGROUND

Electronic messaging systems, such as email, Instant Messenger, and social networking sites, are commonly used for communication both within and outside the workplace. Generally, a user composes an electronic message with information to be received and reviewed by a recipient. The electronic message received by the recipient can be stored, replied to, or forwarded to other recipients, which can result in the addition or deletion of content and recipients. Thus, organization, sharing, and distribution of the information through the electronic messaging systems can be overwhelming and difficult to manage due to the changing environment.

Current electronic messaging systems offer keyword searches to identify electronic messages. However, keyword searches are limited since the keyword must be included in the content of the electronic message and users often have no control over the content if they are recipients of the electronic message. Commonly, the electronic messaging systems also provide a list or "address book" of potential recipients for addressing electronic messages for delivery. However, the list fails to identify which recipients are interested in receiving electronic messages regarding a particular subject matter and a user may be unable to determine the appropriate recipients or obtain email address for the appropriate recipient.

Content tagging systems are available to organize electronic information gathered by users using tags. The tags are assigned to a piece of electronic info and can describe a topic or content of the info, which allows users to easily find the tagged information through a tag search. Conventional tagging systems include Delicious and Diigo. However, use of the current tagging systems can be impractical and burdensome due to the need to incorporate a separate system into a user's daily routine. For example, each user client must be installed with the tagging system and registered with the appropriate server. Thus, the tagging systems are not easily incorporated. Also, the tagging systems fail to generate and maintain associations between tags, electronic information, and users.

Further, content sharing systems, such as wiki workplaces and boundaryless organizations, emphasize group collaboration with user interest being broadcast and user participation changing over time. However, the dynamics of the content sharing systems are often difficult to manage due to the constantly changing environment and fail to address generating and maintaining groups of users based on interest in particular subject matter.

Thus, a system and method for unobtrusively integrating content tagging and distribution with existing communication structures and services is needed.

SUMMARY

A message, such as an email is provided with a structured tag address identifying one or more content tags, a tag server, and a domain. The email message is received by an email server, which processes the structured tag address to identify the content tags, which are each applied to a user-to-tag association record.

An embodiment provides a system and method for content tagging and distribution through email. A user-to-tag record including content tags, each associated with one or more users, is maintained. An incoming email message with a tag address is received. The tag address is processed to identify a content tag, which is applied to the user-to-tag record. Users associated with the identified content tag are determined. The incoming email message is provided to the associated users.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 3A is a data structure diagram showing a schema for a tag-to-user association record.

FIG. 3B is a data structure diagram showing a schema for a content-to-tag association record.

FIG. 5 is an individual group table showing, by way of example, user inclusion in a group associated with a content tag.

DETAILED DESCRIPTION

Identifying and distributing relevant data can be frustrating and extremely time consuming due to large amounts of available information and a lack of knowledge regarding appropriate recipients. Conventional tools for tagging and distributing data require installation on individual clients and registration with a server and thus, are not seamlessly incorporated into daily practice. Content tagging and distribution through email allows a user to tag and distribute relevant data without disrupting existing daily routines.

Figure 1:
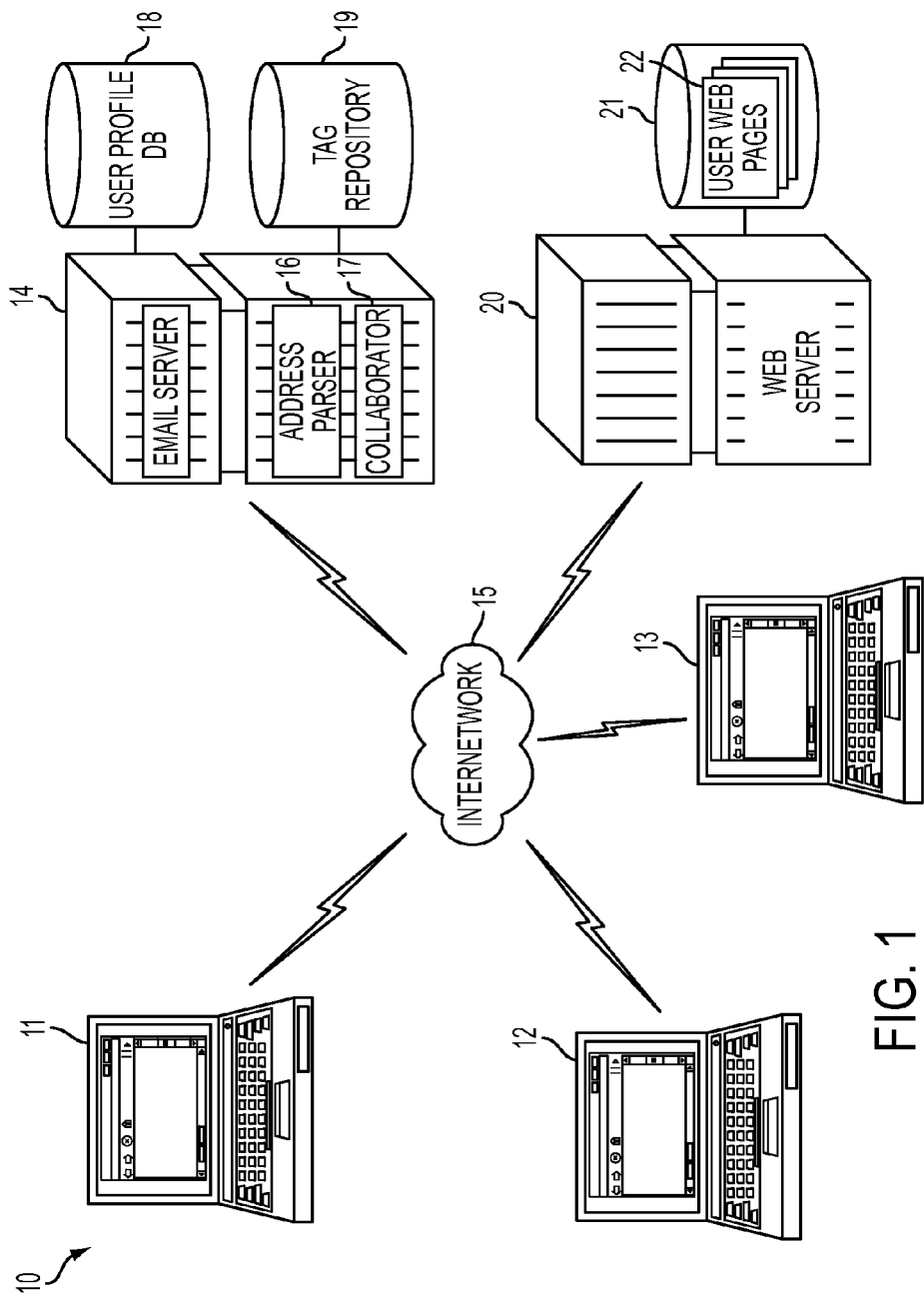
FIG. 1 is a system for content tagging and distribution through email, in accordance with one embodiment.

A tag address is entered on an email message and is used to classify the email message as well as identify recipients. The tag address includes content tags that are expressed as an email address in a field of an email message, such as the To, CC, and BCC fields. FIG. 1 is a system for content tagging and distribution through email, in accordance with one embodiment. One or more user devices 11-13 are connected to an email server 14 via an Internetwork 15, such as the Internet. The user devices 11-13 can include a computer, laptop, or mobile device, such as a cellular telephone or personal digital assistant (not shown). In general, each user device 11-13 is a Web-enabled device that executes a Web browser and email program, which supports interfacing tools and information exchange with a Web server 20 and the email server 14.

The email server 14 receives email messages (not shown) from one or more of the user devices 11-13. Each email message includes a tag address entered into an address field. The tag address can include a structure for defining a content tag, an email server, and a domain. For example, the structure of the tag address can include contenttag@tagserver.company.domain. The content tag can be selected by a user, such as the composer of the email message, based on the content of the email message. Examples of the content tag include topics, keywords or proper nouns that describe one or more characteristics of the email message content. The email message can also be populated with conventional personal email addresses, which identify a recipient and a domain to which the email message will be transmitted. Transmission of email messages from a user device 11-13 to the email server 14 can occur through the Simple Mail Transfer Protocol, as well as other messaging protocols.

The email server 14 includes an address parser 16 to process the email message once received and a collaborator 17. The address parser 16 identifies the tag addresses and personal email addresses, if any, and parses each tag address according to the particular address structure to identify the content tags. Information is extracted from the email message, such as the content tags, personal email addresses, and email content for storage in a tag repository 19, which is interconnected to the email server 14. The tag repository 19 stores association records for associating the extracted content tags, users, and emails messages, as well as email metadata, including time, date, and subject. Other types of data and metadata are possible. The association records can include a tag-to user record, content-to-tag record, and user-to-tag record. The tag-to-user record associates content tags with a particular user, while the user-to-tag record associates users with a particular content tag. The content-to-tag record associates email messages with a particular content tag. Other association records are possible, including a tag-to-content record.

In one embodiment, each association record is stored and maintained as separate records. However, in a further embodiment, each of the association records can be combined into a single record. The association records are further described below with reference to FIGS. 3A-3C.

The email server 14 is also interconnected to a user profile repository 18 for storing data for a user, such as user account and profile information, access control settings, session data, digest settings, and preferences. The user can include individuals that utilize email tagging and distribution. Each of the users can equally send and receive email messages, which are distributed based on the users' association with a content tag. The user data can be stored for each individual user using a name, address, or other identifier, by role of the individual users, or by groups of the users.

Once the tag address is processed, the email message can be directly transmitted to one or more users associated with the tag and identified via the user-to-tag association record. In a further embodiment, the email message is first processed by the collaborator 17, which organizes and distributes the incoming email messages via a digest. The collaborator 17 can create and distribute digests of incoming email messages, make recommendations, and maintain the association reports stored in the tag repository 19, including creating, deleting, and updating the association reports. Additionally, the collaborator 17 can distribute the incoming email messages based on triggers such as event feeds, subscriptions, and triggers from other data sources, including web resources and internal or external data repositories.

The user devices 11-13, email server 14, and Web server 20 each include components conventionally found in general purpose programmable computing devices, such as a central processing unit, memory, input/output ports, network interfaces, and non-volatile storage, although other components are possible. Moreover, other information sources in lieu of or in addition to the servers, and other information consumers, in lieu of or in addition to the user devices, are possible.

A user can control his associations with content tags, email messages, other users, and email messages via a customized association Web page 22 that is accessed by one of the user devices 11-13 from a Web server 20 via the internetwork 15. The association Web page 22 can be stored in a Web page database 21 with other association Web pages. Once requested, each association Web page 22 can display the content tags associated with the user, received email messages, other users, and groups to which the user belongs. Other displays of the association Web pages are possible. Additionally, the association Web pages allow the user to set digest preferences, add or remove a content tag, add or remove other users or a group of other users, and conduct a search of content tags, other users, or email messages.

The user devices 11-13 and servers 14, 20 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
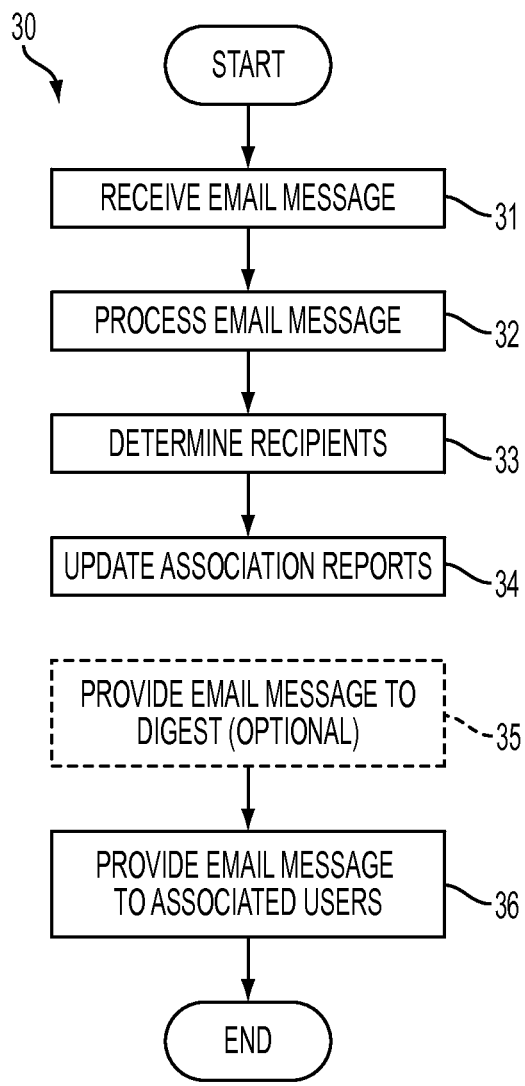
FIG. 2 is a method for content tagging and distribution through email, in accordance with one embodiment.

Content tagging through email allows a user to classify email content, as well as associate the email content with other users. FIG. 2 is a method for content tagging and distribution through email, in accordance with one embodiment. An incoming email message with one or more tag addresses is received by an email server (block 31). The incoming email message is processed (block 32) to locate recipient email addresses, if any, and to identify at least one content tag within each tag address. Once identified, the content tag is applied to an association record, such as a user-to-tag association record to determine those users associated with the identified content tag (block 33). Other association records, such as tag-to-user or content-to-tag association records are possible. The association records are further discussed below with reference to FIGS. 3A-3C. The association records can then be updated with information from the incoming email message, such as the identified content tag, users associated with the recipient email addresses or the content tag, and content of the incoming email message, as well as email metadata (block 34). Updating the association records can include adding or removing content tags, adding or removing users and storing content of the incoming email message, which are discussed below with further detail to FIGS. 4 and 5.

The incoming email message can then optionally be provided to a digest associated with one or more of the identified users (block 35). Otherwise, the incoming email message can be provided to the users associated with the content tag or identified by the recipient email addresses (block 36) by delivering the digest or displaying the email message on an association Web page. Alternatively, the email message can be directly delivered to the associated users. In a further embodiment, the incoming email message can be provided to a digest or transmitted to a user prior to updating the association records, rather than subsequent to the record updates.

Figures 3A, 3B:
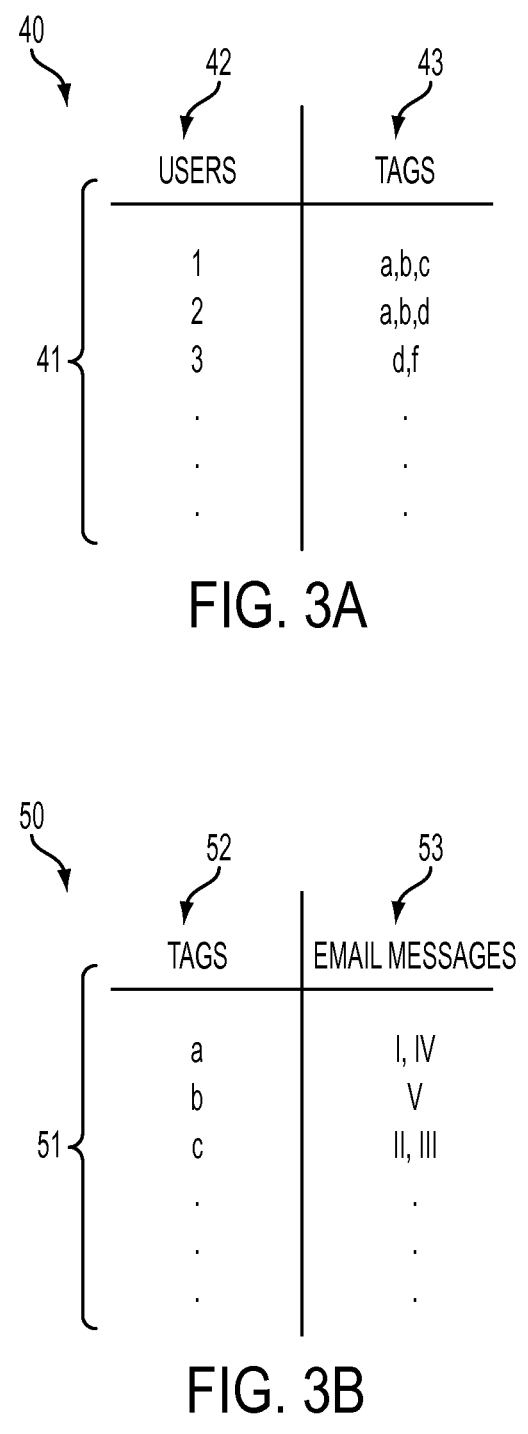

The association records each associate at least two of content tags, users, and email messages. FIG. 3A is a data structure diagram showing a schema 40 for a tag-to-user association record 41. Users 42 are mapped against content tags 43 to identify those content tags 43 associated with a particular user 42. The users and content tags can each be represented by an identification number, symbol, or code, as well as other identifiers. The identified content tags 43 can be displayed on an association Web page for review or modification by that particular user 42. Other uses of the tag-to-user association record are possible.

Additional association records are also possible. FIG. 3B is a data structure diagram showing a schema 50 for a content-to-tag association record 51. Content tags 52 are mapped against email messages 53 to identify those email messages 53 associated with a particular content tag 52. The content tags 52 and email messages 53 can each be represented by an identification number, symbol, or code, as well as other identifiers. The identified email messages 53 can be accessed through a content tag search and displayed on an association Web page for review by a user. Other uses of the content-to-tag association record are possible.

Figure 3C:
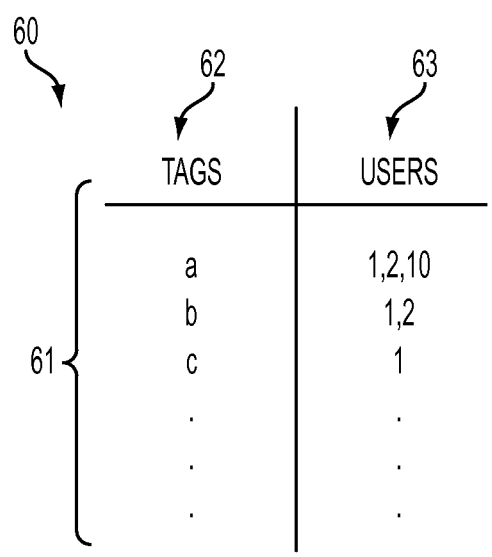
FIG. 3C is a data structure diagram showing a schema for a user-to-tag association record.

Users associated with a content tag can be identified via a user-to-tag association record. FIG. 3C is a data structure diagram showing a schema 60 for a user-to-tag association record 61. Content tags 62 are mapped against users 63 to identify those users 63 associated with a particular content tag 62. The content tags 62 and users 63 can each be represented by an identification number, symbol, or code. Other identifiers are possible. The content tag-user association record can be used to identify users as recipients of an incoming email message, which is further discussed below with reference to FIG. 4. Other uses of the user-to-tag association record are possible.

Figure 4:
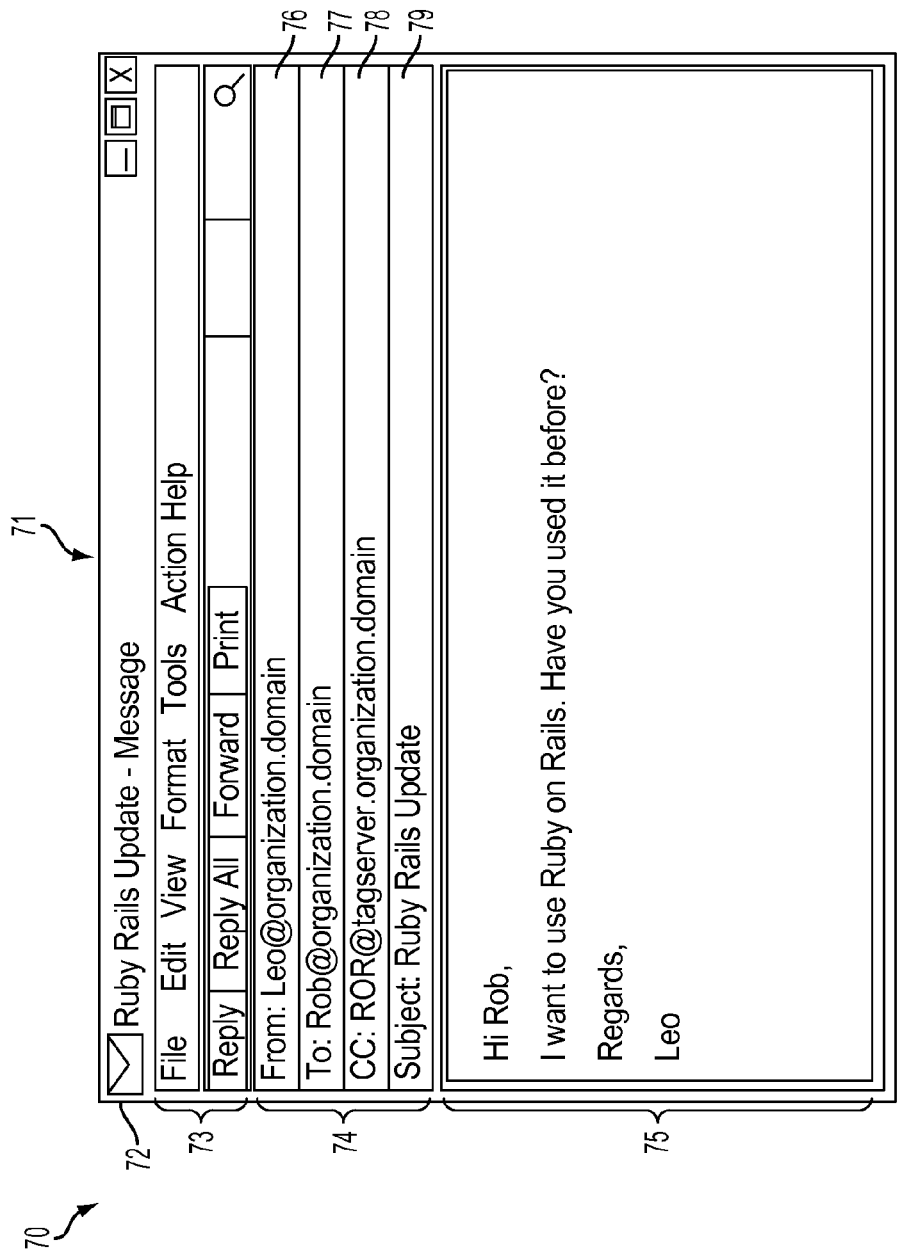
FIG. 4 is a screenshot showing, by way of example, an email message with a tag address.

An email message can include a tag address for classifying content of the email message, identifying users as recipients, and associating recipients with content tags of interest. FIG. 4 is a screenshot 70 showing, by way of example, an email message 71 with a tag address 78. The email message 71 includes fields, such as a title field 72, user option field 73, transmission field 74, and content field 75. The title field 41 includes a subject heading of the email message 71, which is also included in subject subfield 79. The user option field 73 includes user-selectable options for composing and transmitting the email message 41. The information heading 74 includes a sender subfield 76, recipient subfield (To) 77, copy subfield (CC) 78, and subject subfield 79. The content field 75 includes content of the email message 71, including text, images, links, audio files, and video files, as well as other types of content. Other fields and subfields are possible, such as a blind copy subfield.

Prior to transmission of the email message 71, one or more of the fields, including the recipient 77 or copy 78 subfields, can be populated with an email address or a tag address. The email address can include a two-part structure to identify one or more recipients and a domain to which the incoming email message is transmitted. The structure for a tag address includes one or more content tags, a specified server, and domain. An example of a tag address with one content tag is contenttag@tagserver.company.domain and an example of a tag address with multiple tags is tag1+tag2@tagserver.company.domain. In one example, a user, Leo is interested in using the open source software Ruby on Rails ("ROR") and would like to get feedback from colleagues having experience with ROR. However, Leo is uncertain which of his colleagues are familiar with ROR but recalls that Rob may have previously used the software. Leo composes an email message requesting information regarding ROR and populates the recipient subfield with Rob's email address, Rob@company.domain. Additionally, as Leo is uncertain as to other colleagues' knowledge regarding ROR, Leo populates the copy subfield with a tag address, ROR@tagserver.company.domain, which is associated with users interested in ROR.

Once entered, recommendations can be provided to the user based on the tag address. The recommendations can include content tags, email messages, users, and advertisements that are related to the entered tag address. The recommendations can be displayed as a pop-up notice, email message, alert notification, or as a display on the email message. Other recommendations and displays of recommendations are possible. The recommendations can be provided in response to composing an email message, transmitting an email message, or receiving an email message. Following the above example, once Leo populates the copy subfield with the ROR tag address, a recommendation is displayed informing Leo that the tag address ROR-plugins@tagserver.company.com is closely related to the ROR tag address. Leo can then select the recommended tag address, if relevant. In one embodiment, the content tag, ROR-plugins, can be identified and stored as a content subtag of ROR. Other examples are possible.

The composed email message is then transmitted by the sending user for processing of the tag address, which can identify a content tag, ROR; a server, tagserver; and a domain, company.domain. The identified content tag, ROR, is applied to a user-to-tag association record to determine one or more users associated with the tag, ROR. The associated users are identified as having an interest in email messages regarding the content tag, ROR. User association with a content tag allows those users to automatically receive email messages having related content even though the email message is not specifically addressed to the users, such as by the users' personal email addresses. The email message is then delivered to the associated users and Rob, whose personal email address was listed in the recipient subfield 77, as recipients.

In a further embodiment, the email message can be delivered to the recipients based on an assigned priority. The email message can be compared with previously received email messages having one or more matching content tags to determine whether the content of the email message is the same as or substantially similar to the previously received email messages. If the email message is the same or substantially similar to one or more of the previously received email messages, the incoming message can be assigned a low priority value. If the incoming message is not the same or substantially similar to one or more of the previously received email messages, the incoming message can be assigned a higher priority value. The priority values can also be determined based on other email message characteristics and metadata, such as recipients, sender, subject, inclusion in a thread. The email message can be delivered to the recipient users based on the assigned priority. In one embodiment, the highest priority email messages are transmitted first followed by the lower priority email messages. In a further embodiment, the same or substantially similar incoming message can be archived, rather than delivered to the associated users.

In yet a further embodiment, the email message can be placed into a digest generated by at least one of the associated users prior to delivery. Subsequently, the digest with the incoming email message is delivered based on settings provided by the associated user via an association Web page. The associated user can establish rules, such as digest criteria and delivery criteria via the settings, such as described in commonly-assigned U.S. Patent Application Publication No. 2008/0098125, published on Apr. 24, 2008, the disclosure of which is incorporated by reference. The digest criteria can include rules for identifying and selecting email messages for inclusion in the digest, whereas the delivery criteria can include rules for determining when to deliver the digest. In yet a further embodiment, a user can be alerted when an email message is entered into the digest by providing a notice when the user logs into his association Web page.

The association records provide information to the association Web pages for display and can be updated during or subsequent to the processing of the email message. Returning to the example above, the content of the email message can be stored with the associated content tag in a content-to-tag association record and the content tag, if new, can be stored in a tag-to-user record, content-to-tag record, and user-to-tag record. The updated association records allow Leo or another user to identify a group of related email messages or identify the content tags associated with the content of the message. Additionally, a recipient identified by a personal email address, rather than a tag address, can be automatically added to the group of users associated with the content tag identified by the tag address. Returning to the above example, Rob is automatically added to the group of users associated with the content tag, ROR, by updating the user-to-tag association record and tag-to-user association record. Once updated, Rob will begin to receive all incoming email messages addressed with the tag address for ROR. Rob can access an association Web page for reviewing all email messages with the ROR tag address.

In one embodiment, a user automatically added to the group of users associated with a particular content tag may receive a confirmation email message, which informs the user that they have been added. The confirmation email message can include a remove button to allow the newly-added user to remove himself from the group. In a further embodiment, the added user can remove himself from the group of users via an individualized association Web page.

The group of users associated with a particular content tag can be built automatically and incrementally such that the users, content tags and email content evolve over time. FIG. 5 is an individual group table 80 showing, by way of example, user inclusion in a group associated with a content tag. The table 80 includes columns for delivery data 81, group member data 82, and email message content data 83. Rows of the table 80 are populated with information 84 extracted from a thread of email messages, which are listed in chronological order, beginning with the first received email message.

Users listed in the email message thread via a personal email address can be incrementally added to the group associated with a content tag in a tag address. For example, Leo sends an email message regarding Ruby on Rails to Rob using Rob's personal email address. At this time, no group is formed as a tag address has not yet been used. Upon receipt, Rob forwards Leo's email message to Nick and copies Leo using Leo's personal email address. Additionally, Rob enters a tag address with a content tag, ROR, which is an acronym for Ruby on Rails. The tag address can be a previously created address or a new address. The tag address directs the email message to an email server, which processes the message to record the content tag, ROR, and to form a group associated with the content tag. The group can include those users listed on the email message, specifically, Leo, Rob, and Nick.

Once processed, the email message is delivered to the users of the group as recipients. Nick replies to Rob and copies, Paul and Leo. The tag address is also included in the copy field. Once sent, the email message is again transmitted to the email server, which processes the message by adding Paul, a new user, to the group associated with the content tag, ROR. Subsequently, the email message is delivered to each of the users in the group as recipients. In a further embodiment, each of the users can add additional content tags to the email thread via tag addresses. The users associated with the ROR content tag can then be added to the group of users associated with the additional tags and the email message is delivered to each user associated with the additional content tags.

Figure 6:
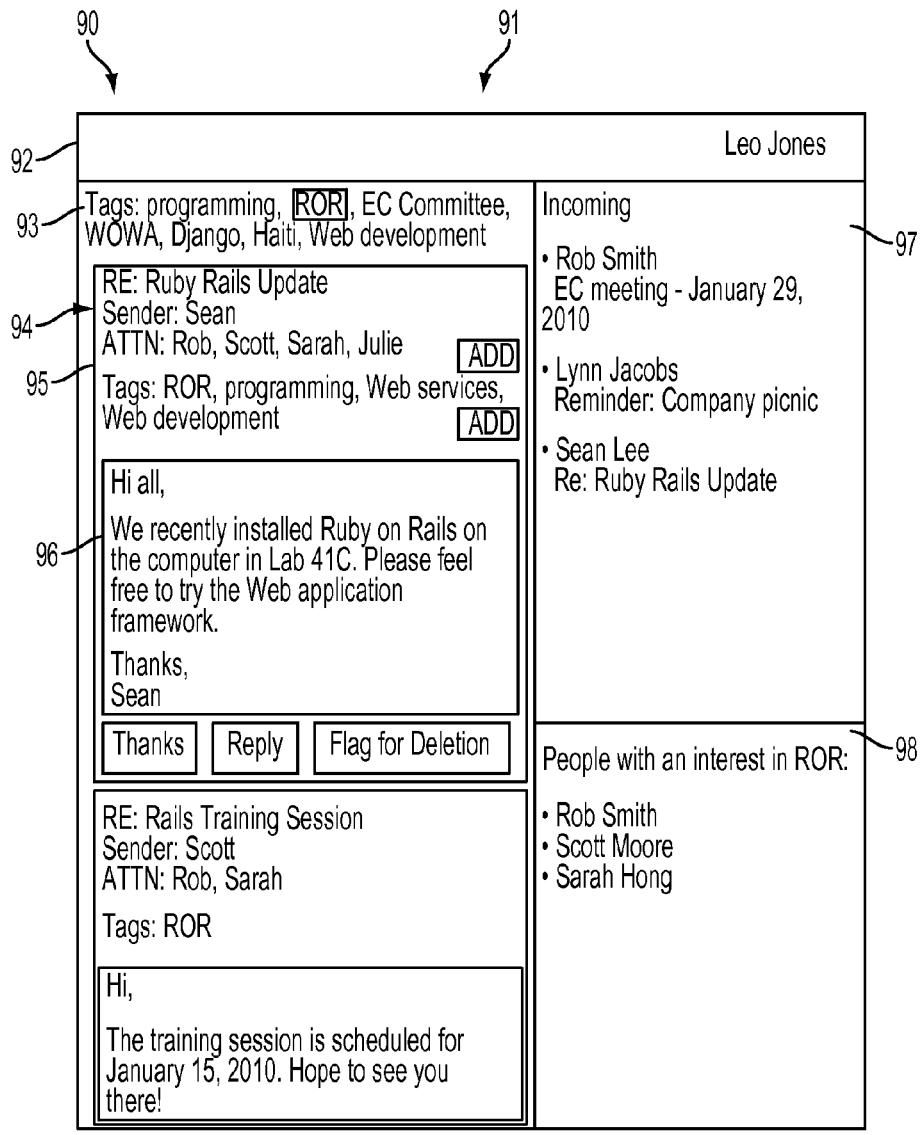
FIG. 6 is a screenshot showing, by way of example, a Web page for viewing content tags, users, and email messages.

The users can manage their personal content tag associations, such as ROR, via an individualized association Web page. The individualized association Web pages allow a user to conduct a search of incoming email messages received by the user, maintain content tags, and identify other users associated with the content tags. FIG. 6 is a screenshot 90 showing, by way of example, an association Web page 91 for viewing content tags 93, users 98, and email messages 94. The association Web page 91 can be customized for a particular user or generalized for one or more users. To access an association Web page, a user can enter login information, such as a user name and password. Other methods to access an association Web page are possible.

The association Web page 91 can include a page header 92, tag cloud 93, email messages 94, a list of incoming email messages 97, and a list of other users 98 associated with one of the content tags in the tag cloud 93. The page header 92 includes an identifier, such as a name of or personal email address for the user. The tag cloud 93 includes content tags identifying content of interest to and associated with the user. More specifically, the content tags can represent a topic or subject of the email message content 96. Each content tag can be associated with at least one of the incoming email messages. One or more of the content tags can be selected by the user to display associated email messages 94. The selected content tags can be identified by a visual marking, such as highlighting, circling, or enlarging of the content tag. Other visual markings are possible.

Each email message 94 displayed can include an email header 95 and email content 96. The email header 95 can include a subject field, sender field, attention or recipient field, and content tag field. The subject field identifies a subject of the displayed email message 94, while the sender field identifies a sender of the displayed email message. The attention or recipient field includes a list of all other users who received the displayed email message 94. The other users can include users associated with one of the content tags listed in the tag field 93 or users, which are identified individually by their personal email addresses. The content tag field identifies content tags assigned to the displayed email message 94. Each of the attention and content tag fields can include an "add" button to allow the user to respectively add additional users or content tags for association with the displayed email message. Alternatively, a "delete" or "remove" button can be provided to allow the user to remove a tag from an email message or remove himself from a group associated with a particular content tag.

The customized association Web page 91 can also include a list of incoming email messages 97 and a list of users associated with the selected tag 98. The list of incoming email messages 97 can include only those email messages associated with the selected tag or all incoming email messages. Meanwhile, the list of users can include the users associated with one or more selected tags. Other fields and displays of the association Web page 91 are possible.

Although tag addressing and group formation have been discussed above with respect to email, other messaging systems such as Instant Messenger, Twitter, and Facebook are possible. At a minimum, the messaging system should include a means for addressing and transmitting electronic messages.

In a further embodiment, the tag address can be used to store email messages associated with a particular content tag for easy access by the originating user or for review by other users. For example, a user is studying the online game, World of Warcraft and finds relevant and interesting Websites with information regarding the game. The user can copy a link of each Website for including in one or more email messages. Alternatively, the information from the Websites can be manually typed in one or more email messages. Each of the email messages can be populated with a tag address, such as WOWA@tagsmemory.company.domain, which directs the email messages to be stored in a tag database under the tag, WOWA. Subsequently, the user can access all previously transmitted email messages with the content tag WOWA via an individualized association Web page. The stored email messages can be available for review by the public or by authorized users only.

In yet a further embodiment, the content tags can be represented in a hierarchical list of tags, including tags and subtags.

While the invention has been particularly shown and described as referenced to the embodiments thereof, those skilled in the art will understand that the foregoing and other changes in form and detail may be made therein without departing from the spirit and scope of the invention.

What is claimed is:

1. A system for content tagging and distribution through email, comprising:
  a user-to-tag record comprising content tags, each associated with one or more users;
  a processor to receive an incoming email message comprising a tag address and an email address and to identify a content tag by processing the tag address;
  a determination module to apply the content tag to the user-to-tag record and to determine the users associated with the identified content tag;
  a comparison module to compare content of the incoming email message against previously received email messages with the same identified content tag;
  a content determination module to determine whether the content was included in at least one of the previously received email messages;
  an assignment module to assign a priority of delivery to the incoming email message based on the determination;
  a parser to determine a recipient associated with the email address and to add the recipient as one of the users to the user-to-tag record with the identified content tag; and
  a distribution module to provide the incoming email message to the associated users based on the priority of delivery.

2. A system according to claim 1, further comprising:
  a content-to-tag record of the content tags, each associated with one or more email messages; and
  a database to store content of the incoming email message with the identified content tag in the content-to-tag record.

3. A system according to claim 1, further comprising:
  a display of the incoming email message with the identified content tag and associated users.

4. A system according to claim 1, further comprising:
  a digest module to generate a digest for at least one of the associated users, comprising:
    a digest criteria module to place the incoming email into the digest; and
    a delivery module to deliver the digest to the at least one associated user.

5. A system according to claim 1, wherein the tag address is entered in at least one of a recipient field, copy field, and blind copy field of the incoming email message.

6. A system according to claim 1, further comprising:
  a content tag identification module to identify an additional content tag in the tag address;
  a user determination module to apply the additional content tag to the user-to-tag record and to determine additional users associated with the additional content tag; and
  the distribution module to provide the incoming email message to the additional associated users.

7. A system according to claim 1, further comprising:
  a tag address module to identify in the incoming email message, an additional tag address comprising an additional content tag;
  a user determination module to apply the additional content tag to the user-to-tag record and determining additional users associated with the additional content tag; and
  the distribution module to provide the incoming email message to the additional associated users.

8. A system according to claim 1, further comprising:
  a recommendation module to generate recommendations based on the incoming email message; and
  a recommendation distribution module to provide the recommendations to at least one of a sender of the incoming email message and the associated users.

9. A method for content tagging and distribution through email, comprising:
  maintaining a user-to-tag record of content tags, each associated with one or more users;
  receiving an incoming email message with a tag address and an e-mail address and processing the tag address to identify a content tag;
  applying the content tag to the user-to-tag record and determining the users associated with the identified content tag;
  comparing content of the incoming email messages against previously received email messages with the same identified content tag;
  determining whether the content was included in at least one of the previously received email messages;
  assigning a priority of delivery to the incoming email message based on the determination;
  determining a recipient associated with the email address and adding the recipient as one of the users to the user-to-tag record with the identified content tag; and
  providing the incoming email message to the associated users based on the priority of delivery.

10. A method according to claim 9, further comprising:
  maintaining a content-to-tag record of the content tags, each associated with one or more email messages; and storing content of the incoming email message with the identified content tag in the content-to-tag record.

11. A method according to claim 9, further comprising:
providing a display of the incoming email message with the identified content tag and associated users.

12. A method according to claim 9, further comprising:
generating a digest for at least one of the associated users, comprising:
  placing the incoming email into the digest; and
  delivering the digest to the at least one associated user.

13. A method according to claim 9, wherein the tag address is entered in at least one of a recipient field, copy field, and blind copy field of the incoming email message.

14. A method according to claim 9, further comprising:
identifying an additional content tag in the tag address;
applying the additional content tag to the user-to-tag record and determining additional users associated with the additional content tag; and
providing the incoming email message to the additional associated users.

15. A method according to claim 9, further comprising:
identifying in the incoming email message, an additional tag address comprising an additional content tag;
applying the additional content tag to the user-to-tag record and determining additional users associated with the additional content tag; and
providing the incoming email message to the additional associated users.

16. A method according to claim 9, further comprising:
generating recommendations based on the incoming email message; and
providing the recommendations to at least one of a sender of the incoming email message and the associated users.

* * * * *